Figure 1:
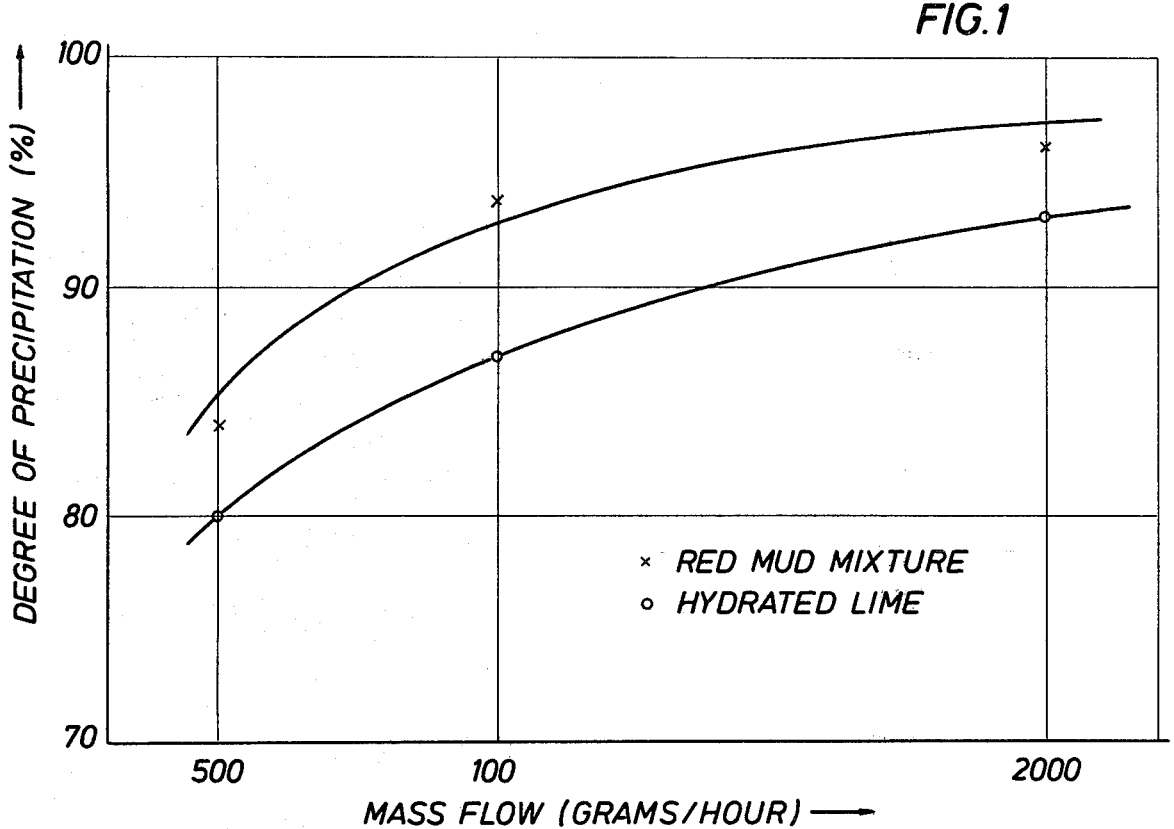

United States Patent [19]

Zopff et al.

[11] 4,341,745
[45] Jul. 27, 1982

[54] PROCESS FOR ELIMINATING ACIDIC COMPONENTS FROM WASTE GASES

[75] Inventors: Hans Zopff, Ratekau; Hans-Ekkehard Müller, Hamburg, both of Fed. Rep. of Germany

[73] Assignee: Kommanditgesellschaft "ALBERTA" Chemische Fabrik GmbH & Co., Hamburg, Fed. Rep. of Germany

[21] Appl. No.: 170,063

[22] Filed: Jul. 18, 1980

[30] Foreign Application Priority Data

Aug. 1, 1979 [DE] Fed. Rep. of Germany ....... 2931169

[51] Int. Cl.³ ............................................. B01D 53/34
[52] U.S. Cl. .................................... 423/210; 423/230; 423/231; 423/240; 423/244; 252/191; 252/475
[58] Field of Search .................... 423/230, 231, 240 S, 423/244 A, 244 R, 210 S, 600; 252/475, 466 J, 191

[56] References Cited

U.S. PATENT DOCUMENTS 2,919,174  12/1959  Pring ................................ 423/240 S
3,551,093  12/1970  Myers et al. .................... 423/244 A
3,580,702   5/1971  Myers et al. .................... 423/244 A
4,018,679   4/1977  Bölsing ............................... 210/751

FOREIGN PATENT DOCUMENTS 2328777  2/1975  Fed. Rep. of Germany .
2328778  2/1975  Fed. Rep. of Germany .
2553789  2/1977  Fed. Rep. of Germany .
2553791  2/1977  Fed. Rep. of Germany .
 721506  1/1955  United Kingdom ........... 423/244 A
1563504  3/1980  United Kingdom .

OTHER PUBLICATIONS

Chemical Abstracts, vol. 54, 1960, 17848e, 17848f.
Chemical Abstracts, vol. 54, 1960, 21710f.
McGraw-Hill, "Dictionary of Scientific and Technical Terms", 2nd Ed., 1978.

Primary Examiner—Earl C. Thomas
Attorney, Agent, or Firm—Vaden, Eickenroht, Thompson, Bednar & Jamison

[57] ABSTRACT

Acid gases are removed from waste gases by contacting said gases with an absorbent which is a direct reaction product a mixture of red mud and an alkaline earth metal hydroxide or aluminum oxide.

6 Claims, 2 Drawing Figures

PROCESS FOR ELIMINATING ACIDIC COMPONENTS FROM WASTE GASES

DESCRIPTION

The invention relates to a process for eliminating acidic components from waste gases by means of finely particulate basic adsorbents introduced into the waste gas stream.

In industrial plants, for example refuse incineration plants, thermal power stations based on mineral oil or coal, metallurgical works, cement factories and the like, large quantities of waste gases are obtained, which contain acidic constituents, in particular HF, HCl, $SO_2$ and $SO_3$.

To remove these acidic constituents, a large number of processes have been disclosed, for example catalytic conversion, adsorption on fixed or moving CaO beds, adsorption in milk of lime ($Ca(OH)_2$ suspensions) and the like.

A review of processes of the type initially mentioned is to be found in "Systemanalyse Entschwefelungsverfahren [Systems Analysis of Desulphurisation Processes]", part B, edited by: VGB Technische Vereinigung der Groskraftwerksbetreiber e.V. [Technical Association of Large-scale Power Station Operators], Essen, November 1974, pages 248–253. The processes described in this publication admittedly relate to the adsorption of $SO_2$ and $SO_3$ on CaO beds, but processes of this type are also applicable to the adsorption of other acidic components.

Finely particulate calcium oxide, which is used as the adsorbent according to the abovementioned processes, has a small surface area and consequently a low stoichiometric efficiency with respect to the adsorption of acidic waste gas components by chemical bonding. Accordingly, the object of the invention is a resorption process in which a special, particularly reactive basic resorbent can be used.

Figure 2:
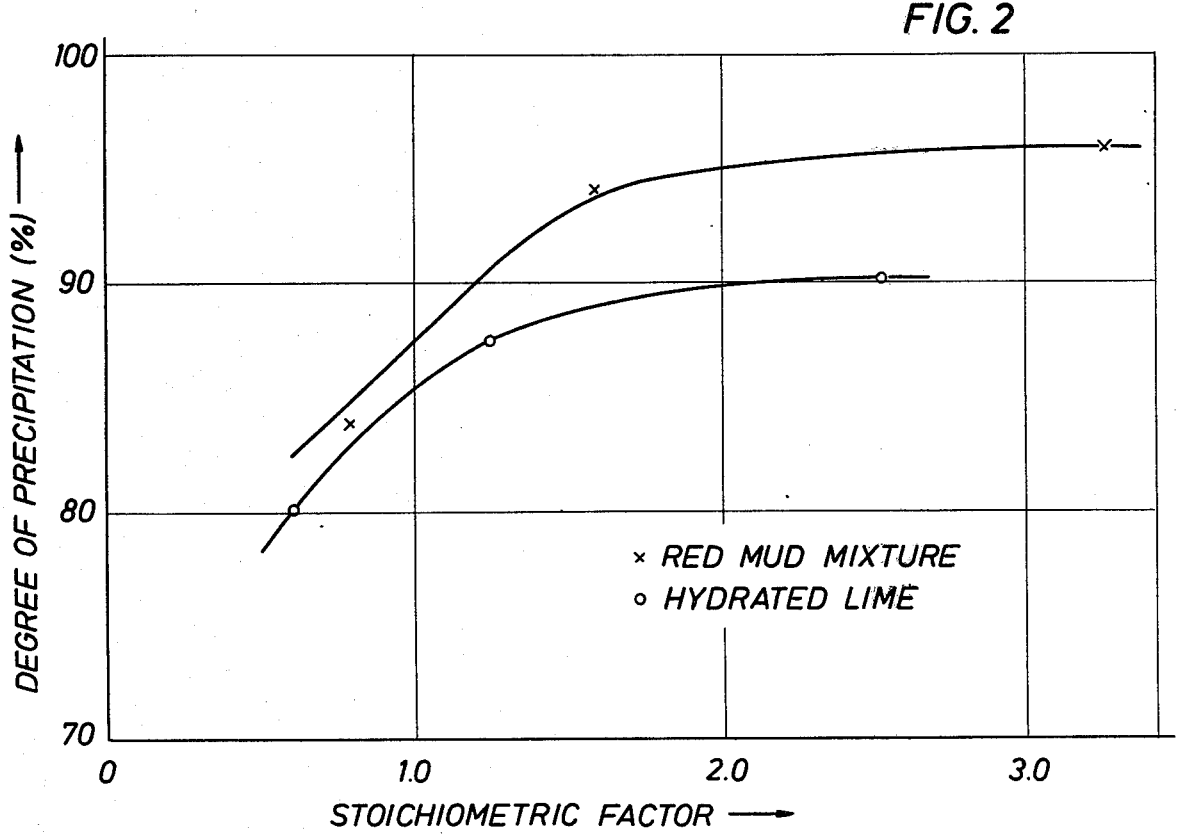

FIG. 1 is a graph depicting the degree of precipitation of HCl versus mass flow per unit of time while FIG. 2 is a graph depicting the degree of precipitation of HCl versus the stoichiometric factor allocated to each mass flow.

According to the invention, this object is achieved when the adsorbent used is a mixture of red mud and an alkaline earth metal hydroxide or aluminium hydroxide, which mixture has been prepared by reacting alkaline earth metal oxides or aluminium oxide with virtually stoichiometric quantities of water in the presence of red mud.

The process of the invention has the following advantages:

1. The adsorbents used according to the invention have a more favourable stoichiometric factor than calcium oxide or solid calcium hydroxide.
2. It provides a new possible utilisation of red mud which is available in large quantities and the major part of which was not exploited hitherto. Red mud is an iron rich residue obtained from the Bayer process in purifying bauxite by heating it in a sodium hydroxide solution.
3. As far as the adsorption processes hitherto disclosed require wet scrubbing, the process according to the invention eliminates the necessity of reheating the purified waste gas after wet scrubbing and before introducing it into stacks; this results in a considerable energy saving.

Red mud/calcium hydroxide mixtures, such as can be used in the process according to the invention, are known from German Offenlegungsschrift No. 2,533,791, Example 8. In this example, it is stated that mixtures of this type can be employed as fillers. The same composition is described in German Offenlegungsschrift No. 2,533,789.

The preparation of the red mud/hydroxide mixtures, which are to be employed according to the invention, can be carried out in the following manner:

1. In accordance with German Offenlegungsschrift No. 2,382,777 and 2,328,778, alkaline earth metal oxide or aliminium oxide can be added to substances which are sparingly soluble in water, the said oxides having been pretreated with substances which render them hydrophobic and delay the reaction with water. In place of the sparingly soluble organic substances mentioned in these publications, red mud can also be employed without difficulty. Subsequently, the oxides are allowed to react with the water present in the system (red mud in general contains water) or with approximately stoichiometric quantities of water, to give the hydroxide. Calcium oxide is particularly suitable as the alkaline earth metal oxide.

In the course of the reaction of the calcium oxide with water to give calcium hydroxide, the red mud particles are adsorbed extremely finely and uniformly on the calcium hydroxide phase being formed.

2. A similar process is described in German Offenlegungsschriften Nos. 2,533,789 and 2,533,791 already mentioned; in this case, however, alkaline earth metal oxides or aluminium alcoholate, which have not been rendered hydrophobic, are used as the starting material. To prevent this reaction from proceeding in such a way that the hydroxide phase is formed first and the red mud adsorption takes place subsequently, a procedure is followed in which the reaction between the water-containing red mud and the calcium oxide is carried out in a mixer unit running at high speed. If the reaction should proceed too vigorously, it can be delayed by adding higher-boiling alcohols.

With respect to further details of the preparation of the adsorbent employed according to the invention, reference is made to the abovementioned prior publications and to the description which follows.

I.

Preparation of a red mud/calcium hydroxide mixture.

24 kg of red mud having a moisture content of about 50% are mixed, in a mixer unit running at high speed, with 17 kg of CaO at 2000 r.p.m. Taking into account the fact that water is vaporised during the strongly exothermic reaction, the molar ratio CaO/water obtained in the system is 1:1.

The reaction starts almost instantaneously and a temperature of 100° C. is quickly reached, considerable amounts of steam and dust being evolved. After five minutes, the reaction temperature has fallen to 80° C. A powder is obtained which is dry as dust and which shows, under the electron microscope, large calcium hydroxide particles with smaller red mud particles adsorbed on the surface.

The chemical analysis of the adsorbent thus obtained gave the following values:

| Compound | % content |
| --- | --- |
| Ca(OH)$_2$ | 53.0 |
| SiO$_2$ | 3.8 |
| Fe$_2$O$_3$ | 14.9 |
| TiO$_2$ | not determined |
| Al$_2$O$_3$ | 4.2 |
| Na$_2$O | 4.4 |
| Loss on ignition | 2.9 |

The density of the product is 2.77 g/cm$^3$.

II.

Description of the pilot unit

A semi-technical unit was used for separating acidic components out of a hot waste gas stream by means of finely particulate basic adsorbents. In the pilot unit, defined quantities of HCl were jetted into a natural gas flame. The combustion gases flowed through a length of horizontal reactor, into which the red mud/calcium hydroxide mixture was blown by means of a pneumatic conveyor device. The reaction tube was followed by a fabric filter, by means of which the dust particles laden with HCl were separated from the flue gases. Gas analysers working continuously or quasi-continuously were used for measuring the HCl concentrations.

It was possible to vary the operating parameters of the pilot unit within wide limits so that information on the degrees of adsorption as a function of the parameters volumetric flow, reaction temperature, moisture content of the waste gas, metering of the adsorption mixture and type of the adsorbents, could be obtained.

III.

Comparative investigations of the precipitation of HCl on red mud/calcium hydroxide or solid calcium hydroxide.

For comparison of the abovementioned adsorbents in the unit described above, all the other operating parameters were kept constant as far as possible during the test series. HCl was selected as the acidic component contained in the waste gas, since its proportion is particularly high in the waste gases from refuse incineration plants, as simulated here, and since experience in the field of HCl precipitation was already available from numerous investigations on this plant.

The HCl concentrations in the waste gas stream were monitored with the "Sensimeter-G" from Messrs. Bran & Lübbe, which works quasi-continuously.

HCl was precipitated, on the one hand, on pure calcium hydroxide for comparative purposes and, on the other hand, on the red mud/calcium hydroxide mixture mentioned at the beginning. Three different quantities per unit time of each adsorbent were metered in; the degrees of precipitation of the two adsorbents were compared with one another. The degree of precipitation here denotes the quotient of the quantity of HCl precipitated and the quantity metered in. The degree of precipitation for the two adsorbents was plotted in a diagram both versus mass flow per unit time (FIG. 1) and versus the stoichiometric factor allocated to each mass flow (FIG. 2). The degrees of precipitation of every two tests were averaged. The stoichiometric factor is the quotient of the quantity of adsorbent, which has been actually metered in, and that which is stoichiometrically necessary. Differences between the two figures occur here, since the stoichiometric factor for calcium hydroxide is less favourable than that for the red mud/calcium hydroxide mixture.

In accordance with the chemical reaction equation $$Ca(OH)_2 + 2HCl \rightarrow CaCl_2 + 2H_2O$$

1 mol of Ca(OH)$_2$ (74 g) is required for binding two mols of HCl (73 g). These are the stoichiometric conditions when the reaction goes to completion; they are called the stoichiometric factor 1. In the case of the red mud/calcium hydroxide mixture investigated, the stoichiometric ratio of adsorbent to HCl, corresponding to the analysis, relative to calcium hydroxide, has a value of 1.3, since the red mud contents must be taken into account corresponding to their percentage fraction, that is to say equal quantities of the red mud mixture can theoretically bind 1.3 times the quanity of HCl.

IV.

Test parameters and results.

The test parameters and the test results are summarised in the table.

The tests were continued until a constant concentration of HCl, corresponding to the particular quantity of adsorbent metered in, was established in the pure gas. The moisture content of the waste gas was adjusted to about 8%. The reaction temperature was about 219° C. Per test, 2000, 1000 or 500 g of adsorbent were metered in. The HCl concentrations were measured both on the crude gas side and on the pure gas side. The degrees of precipitation vary corresponding to the stoichiometric factor in the metering of additive.

TABLE

| Test number | Moisture content of the waste gas % | Reaction temperature °C. | Absorbent | Metering of additive g/hour | HCl concentration before adsorption mg/Nm$^3$ | Degree of precipitation % |
| --- | --- | --- | --- | --- | --- | --- |
| 1 | 7.7 | 282 | Ca(OH)$_2$ | 2000 | 1421 | 89.7 |
| 2 | 7.7 | 282 | Ca(OH)$_2$ | 1000 | 1421 | 83.0 |
| 3 | 7.7 | 282 | Ca(OH)$_2$ | 500 | 1421 | 73.0 |
| 4 | 7.9 | 288 | Red*/Ca(OH)$_2$ | 2000 | 1469 | 96.6 |
| 5 | 7.9 | 288 | Red*/Ca(OH)$_2$ | 1000 | 1469 | 95.7 |
| 6 | 7.9 | 288 | Red*/Ca(OH)$_2$ | 500 | 1469 | 88.3 |
| 7 | 8.2 | 291 | Red*/Ca(OH)$_2$ | 2000 | 1521 | 95.7 |
| 8 | 8.5 | 288 | Red*/Ca(OH)$_2$ | 1000 | 1579 | 92.1 |
| 9 | 8.4 | 289 | Red*/Ca(OH)$_2$ | 500 | 1556 | 79.7 |
| 10 | 8.1 | 292 | Ca(OH)$_2$ | 2000 | 1512 | 95.6 |
| 11 | 8.1 | 292 | Ca(OH)$_2$ | 1000 | 1512 | 92.1 |
| 12 | 8.1 | 292 | Ca(OH)$_2$ | 500 | 1512 | 87.3 |

Red* = Red mud

We claim:

1. Process for eliminating acidic components from waste gases by means of finely particulate basic adsorbents introduced into the waste gas stream, characterised in that the adsorbent used is a direct reaction product of a mixture of red mud, an iron rich residue from the purifying of bauxite by the Bayer process, and an alkaline earth metal hydroxide or aluminium hydroxide, which reaction product has been prepared by reacting alkaline earth metal oxides or aluminium oxide with stoichiometric quantities of water in the presence of red mud.

2. Process according to claim 1, characterised in that the alkaline earth metal oxide used is calcium oxide.

3. Process according to claim 1 or 2, characterised in that the adsorbent has a weight ratio between calcium oxide and red mud of 1:1–3:1.

4. Process according to claim 1 wherein red mud with a moisture content of about 50 percent is mixed with calcium oxide in a strongly exothermic reaction with water being vaporized and escaping as steam and yielding after a cooling period of a fine dry power formed of large calcium hydroxide particles with smaller red mud particles absorbed on its surface.

5. Process according to claim 4 wherein the fine dry powder has a composition:

| Compound | Percent Content |
| --- | --- |
| $Ca(OH)_2$ | 53.0 |
| $SiO_2$ | 3.8 |
| $Fe_2O_3$ | 14.9 |
| $TiO_2$ | not determined |
| $AL_2O_3$ | 4.2 |
| $Na_2O_3$ | 4.4 |
| Loss on ignition | 2.9 |

6. Process according to claim 1 wherein the density of the absorbent is about 2.77 $g/cm^3$.

* * * * *